(12) United States Patent
Vermande

(10) Patent No.: US 10,344,840 B2
(45) Date of Patent: Jul. 9, 2019

(54) ACTUATOR NO-BACK ARRANGEMENT

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 0 days.

(21) Appl. No.: 15/709,892

(22) Filed: Sep. 20, 2017

(65) Prior Publication Data

US 2018/0080535 A1 Mar. 22, 2018

(30) Foreign Application Priority Data

Sep. 20, 2016 (EP) .................... 16306198

(51) Int. Cl.
*F16H 25/24* (2006.01)
*F16D 65/18* (2006.01)
*F16D 65/56* (2006.01)
*B60T 11/04* (2006.01)
*B60T 13/02* (2006.01)
*B64C 25/42* (2006.01)
*F16D 55/38* (2006.01)
*B64C 9/02* (2006.01)
*F16D 121/24* (2012.01)
(Continued)

(52) U.S. Cl.
CPC ........ *F16H 25/2454* (2013.01); *B60T 11/046* (2013.01); *B60T 13/02* (2013.01); *B64C 25/42* (2013.01); *F16D 55/38* (2013.01); *F16D 65/18* (2013.01); *F16D 65/186* (2013.01); *F16D 65/567* (2013.01); *B64C 9/02* (2013.01); *F16D 2121/14* (2013.01); *F16D 2121/16* (2013.01); *F16D 2121/24* (2013.01); *F16D 2125/20* (2013.01); *F16D 2125/28* (2013.01); *F16D 2125/36* (2013.01); *F16D 2125/40* (2013.01); *F16D 2127/06* (2013.01)

(58) Field of Classification Search
CPC .... F16H 25/2454; B60T 13/02; B60T 11/046; F16D 65/186; F16D 55/38; F16D 65/567; F16D 65/18; F16D 2121/14; F16D 2127/06; F16D 2125/40; F16D 2125/36; F16D 2121/24; F16D 2125/20; F16D 2121/16; F16D 2125/28; B64C 25/42; B64C 9/02
See application file for complete search history.

(56) References Cited

U.S. PATENT DOCUMENTS 4,762,205 A 8/1988 Ortman
5,141,084 A 8/1992 Lang et al.
(Continued)

FOREIGN PATENT DOCUMENTS

| DE | 19752543 A1 | 6/1999 |
|---|---|---|
| DE | 112012001273 T5 | 12/2013 |
| EP | 2436952 A2 | 4/2012 |

OTHER PUBLICATIONS

European Search Report for Application No. 16306198.9-1762 dated Aug. 1, 2017, 8 pages.

*Primary Examiner* — David J Hlavka
(74) *Attorney, Agent, or Firm* — Cantor Colburn LLP

(57) ABSTRACT

A screw actuator comprises a screw shaft for threaded engagement with an actuator output device such that rotation of the screw shaft causes linear movement of the actuator output device; and a motor for driving rotation of the screw shaft. A no-back device is included for restricting movement of the screw shaft in response to feedback torque applied due to external forces on the actuator output device.

16 Claims, 7 Drawing Sheets

(51) Int. Cl.

| | |
|---|---|
| *F16D 125/36* | (2012.01) |
| *F16D 125/40* | (2012.01) |
| *F16D 121/14* | (2012.01) |
| *F16D 121/16* | (2012.01) |
| *F16D 125/20* | (2012.01) |
| *F16D 125/28* | (2012.01) |
| *F16D 127/06* | (2012.01) |

(56) References Cited

U.S. PATENT DOCUMENTS

| | | | |
|---|---|---|---|
| 6,109,415 A | 8/2000 | Morgan et al. | |
| 6,491,140 B2 | 12/2002 | Usui et al. | |
| 8,348,023 B2 | 1/2013 | Sakashita et al. | |
| 2002/0100647 A1* | 8/2002 | Miyakawa | B60T 13/02 |
| | | | 188/162 |
| 2005/0252735 A1* | 11/2005 | Taylor | F16D 65/183 |
| | | | 188/72.9 |
| 2010/0126811 A1* | 5/2010 | Kim | F16D 65/18 |
| | | | 188/162 |
| 2010/0319477 A1* | 12/2010 | Tateishi | F16H 25/2454 |
| | | | 74/411.5 |
| 2016/0017942 A1 | 1/2016 | Kwon et al. | |

\* cited by examiner

ACTUATOR NO-BACK ARRANGEMENT

FOREIGN PRIORITY

This application claims priority to European Patent Application No. 16306198.9 filed Sep. 20, 2016, the entire contents of which is incorporated herein by reference.

TECHNICAL FIELD

The present disclosure relates to no-back device for a screw actuator and to a method of reacting feedback forces in a screw actuator arrangement

BACKGROUND

Rotary actuators are used for many applications in aircraft, particularly for moving movable flaps of the aircraft. These movable flaps are often subject to high aerodynamic forces which feed back into the actuator and can cause damage to the actuator if not properly reacted. Further, it is necessary to be able to hold movable flaps in a given position against these aerodynamic forces.

It is known to provide a no-back device on a screw actuator to prevent feedback forces (i.e. aerodynamic forces on the movable flap that feed into the nut of the screw actuator) from turning the screw shaft undesirably.

For a given handedness of screw thread on the screw shaft, axial loading of the nut in a first direction along the screw shaft will induce clockwise torque in the screw shaft and axial loading in a second direction, opposite the first direction, will induce anticlockwise torque in the screw shaft. This known relationship between the axial direction and induced-torque direction has been used in no-back devices in the past.

Commonly, a shaft will enter the no-back device. This shaft may be the screw shaft itself or may be another shaft connected to the screw shaft such that torque and axial loading on the screw shaft are both transmitted into the shaft, and thus into the no-back device.

The shaft has a radially extending flange. On either side of the flange, in abutment with the flange, is a brake pad. Each brake pad is in abutment (on its side opposite the flange) with a ratchet. Each ratchet is connected (on its side opposite the brake pad) to a thrust bearing in a housing of the no-back device. The housing is fixed to an airframe of the aircraft such that axial and rotational motion of the housing are prevented.

When a feedback force is applied to the nut of the screw actuator, the flange is axially loaded against one of the brake pads and attempts to rotate in a first direction. The brake pad is loaded against a ratchet that is configured to prevent rotation in the first direction (but to allow rotation in the second direction, i.e. the opposite rotational direction). Thus, the brake pad is squeezed between the ratchet and the flange. The brake pad absorbs/reacts against the torque in the first direction (i.e. it acts in the opposite direction), and thus prevents rotation of the screw shaft in response to the feedback force.

Having the ratchet allows the motor that drives the actuator to apply torque to the screw shaft in the second direction. The aforementioned ratchet is able to freely rotate in the second direction and so the motor does not have to work against the friction between the brake pad and the flange when trying to turn the screw shaft. Instead, the motor only has to work against the torque being induced by the feedback forces on the nut. Such no-back devices are known in the art, as described in U.S. Pat. No. 6,109,415 and in U.S. Pat. No. 4,762,205.

In this type of prior art no-back device wear will accumulate in the no-back device, which will eventually require maintenance. However, disassembly and/or removal of the no-back device can often require removal of the actuator as a whole because the no-back device is required to receive axial loading and torque from the screw shaft. The need for disassembly and/or removal of the whole actuator may complicate the necessary maintenance work.

Further, the requirement that the shaft of the no-back device receives both axial loading and torque experienced by the screw shaft limits the design options for where the no-back device may be located.

Such conventional no-back devices for braking actuators against feedback torque have generally been considered satisfactory for their intended purpose. The present disclosure provides a no-back device that may increase design options available to engineers and may allow easier maintenance than prior art devices. Further, with the present arrangement there is no need for the motor to overcome brake friction when the system is driving in an aiding load.

SUMMARY

According to a first aspect, the disclosure provides a no-back device for a screw actuator, the screw actuator comprising: a screw shaft for threaded engagement with an actuator output device such that rotation of the screw shaft causes linear movement of the actuator output device; and a motor for driving rotation of the screw shaft; the no-back device being for restricting movement of the screw shaft in response to feedback torque applied due to external forces on the actuator output device, and the no-back device comprising a brake and a brake controller; the brake comprising a no-back device brake member for engagement with a screw shaft brake member connected to the screw shaft in order to generate a braking torque on the screw shaft when the brake members engage with one another, and a biasing device for providing a force to urge the brake members to engage with one another when the motor is not activated, this force hence resulting in a braking torque that resists rotation of the screw shaft under feedback torque; and the brake controller being arranged to provide a force to urge the brake members to disengage with one another, this force being applied upon activation of the motor for rotating the screw shaft, in order that the braking torque is reduced when the motor is activated.

This arrangement allows the provision of a no-back device either on-axis or off-axis in relation to the screw shaft. This no-back device does not necessarily require axial feedback forces (that may induce feedback torque) to activate/engage the no-back braking forces. Thus, the no-back device may be arranged to operate without the use of axial feedback forces in relation to the relative movement of the brake members to increase and decrease the braking torque. The brake controller may operate independent of axial feedback forces and/or axial feedback movement of the screw shaft. Advantageously, the screw shaft may be arranged for negligible axial play, since axial movement of the screw shaft is no longer required for operation of the no-back device. The biasing device may engage the brake (i.e. increase the braking torque on the screw shaft by relative movement of the brake members) to prevent movement of the screw shaft regardless of the presence or absence of axial force on the screw shaft. The brake controller may be able to completely remove the braking torque from the screw shaft.

The screw shaft may be connected directly to the screw shaft brake member, or may be connected via intermediate parts such as gears. The screw shaft brake member may be a part of the no-back device and hence may be separate to the screw shaft, or alternatively the screw shaft brake member may be a part of the screw shaft, for example connected to the screw shaft as mentioned above and hence may be separate to the no-back device.

The brake controller may be arranged to move the no-back device brake member relative to the screw shaft brake member to move the brake members apart in order to thereby reduce the braking torque on the screw shaft. For example, with a rotary brake the brake controller may move the no-back device brake member axially relative to the screw shaft brake member.

The brake controller may be a mechanical arrangement arranged such that output torque from the motor is used to move the brake members relative to one another to reduce the braking torque on the screw shaft. This may allow automatic reduction of the braking torque on the screw shaft, such as by disengaging the brake members, whenever the motor outputs torque. Thus, the no-back device may allow for free movement of the screw shaft at any point when the motor starts to output torque.

The brake controller may include a mechanically driven linear actuator for controlling relative movement of the brake members. The mechanically driven linear actuator may receive a rotating input from the motor and provide a linear output. The linear output may be provided only when the screw shaft is not moving freely, such that when the screw shaft can move freely then the linear actuator ceases linear movement.

For example, the brake controller may comprise a ball-ramp device. The ball-ramp device may change in dimension, such as changing axial length, based upon relative rotation of first and second portions of the ball-ramp device. The relative rotation may be induced by the motor turning the first portion of the ball-ramp device while the second portion of the ball-ramp device is held by the no-back device, and the ball-ramp device thereby elongates. This elongation may provide the force to urge the brake members to disengage with one another. The elongation may act to move the brake members relative to one another either directly or indirectly, for example via a mechanical linkage.

The ball-ramp device or other mechanical brake controller may be located in the mechanical path from the motor to the drive shaft. This can reduce the number of components and attachment points required to transmit the motor torque to the drive shaft.

Alternatively, the ball-ramp device or other mechanical brake controller may be located outside of the mechanical path linking the motor to the drive shaft, for example at a point after the mechanical linkage from the motor has reached the drive shaft. In this case the no-back device may include an apparatus for conveying motor torque past the drive shaft while the drive shaft is braked. For example, a differential gear with differential play may be used to allow some limited rotation and/or torque to pass across the braked drive shaft. This rotation and/or torque may be sufficient to relatively rotate the upper and lower portions of the ball-ramp device to release the brake, before the torque enters the drive shaft. This arrangement may reduce the torque experienced by the ball-ramp device allowing the use of lighter/weaker materials for this part.

The brake controller may include an electromechanical actuator for changing the braking torque on the screw shaft. For example, the brake controller may comprise an electromagnet. The electromagnet may, when activated, provide the force to urge the brake members to disengage with one another. The electromagnet may be activated simultaneously with activation of the motor (for example, by the same control electronics). This arrangement allows for fewer mechanical parts in the control of the braking force and potentially greater freedom in placement of the no-back device, since such a system can require only an electrical connection between the motor and the no-back device for controlling the no-back device, rather than a mechanical connection.

The biasing device may be a spring, for example a helical metal spring. Other varieties of biasing device may be used, such as a rubber block, a pneumatic spring, or other arrangements known to the skilled person.

In arrangements wherein the no-back device receives a shaft that transmits feedback axial loads, the no-back device may comprise in order, on one side of a flange of the shaft, the flange being the brake member of the shaft, a brake pad, a ratchet, rollers and the biasing device that urges the brake pad to engage with the flange. The flange forms the screw shaft brake member and the brake pad forms the no-back device brake member. Optionally, similar parts may be present in a symmetrical arrangement on the other side of the flange. Thus, in mirror image on the other side of the flange there may be a brake pad, a ratchet, rollers, and another biasing device that urges the brake pad to engage with the flange. When the motor is inactive the brake pad(s) apply a braking torque to the shaft and resist movement due to feedback torque generated by the interaction of the actuator output device on the screw thread. The rotational forces are absorbed by both the brake pad and the pawls of the ratchet that prevent rotation of the ratchet in that direction. When the motor is activated, the brake controller may disengage the brake pad and/or ratchet in the direction that the motor seeks to turn the drive shaft.

In a second aspect, the present disclosure provides a screw actuator having the no-back device of the first aspect. The screw actuator may be an aerospace actuator, such as a Trimmable Horizontal Stabilizer Actuator (THSA). Reliable operation of no-back devices is particularly important in aerospace applications where the safety of the aircraft can be at risk in the event of unwanted movement. It is also important in aerospace applications for the no-back device to fail safe, which is achieved by the proposed arrangement since movement of the screw shaft can be restricted whenever the motor is not operating.

In a third aspect, the present disclosure provides a method of restricting movement of a screw shaft in a screw actuator in response to feedback torque applied due to external forces on an actuator output device, the method comprising using a no-back device as discussed above, which may include the use of a device with any of the optional features set out above. This aspect may hence provide a method of restricting movement of a screw shaft of a screw actuator in response to feedback torque applied due to external forces on an actuator output device connected to the screw shaft, wherein the screw actuator comprises a motor for moving the actuator output device by rotation of the screw shaft; the method comprising: using a biasing device of a no-back device to engage a no-back device brake member with a screw shaft brake member connected to the screw shaft in order to generate a braking torque on the screw shaft, the biasing device providing a force to urge the brake members to engage with one another when the motor is not activated; and using a brake controller of the no-back device to provide a force to urge the brake members to disengage with one another, this force being applied upon activation of the motor for rotating the screw shaft, in order that the braking torque is reduced when the motor is activated.

The method may include the use of any or all of the features discussed above, for example using a biasing device and/or brake controller as discussed above. The method may include operating the no-back device without the use of axial feedback forces in relation to the relative movement of the brake members to increase and decrease the braking torque. The brake controller may be operated independent of axial feedback forces and/or axial feedback movement of the screw shaft. The method may be for an aerospace screw actuator.

The disclosure further extends to a method including installation of a no-back device as discussed above, which may include the installation of a device with any of the optional features set out above. The method of installation may include making mechanical connections between the no-back device and the screw actuator, such as between the motor and the no-back device and/or between the screw shaft and the no back device. The method may comprise retrofitting the no-back device to a screw actuator that previously had a differing no-back device or previously was not supplied with a no-back device.

The present disclosure allows for arrangements wherein the no-back device is off-axis from the screw shaft of the actuator. In such arrangements, installation, maintenance and replacement of the no-back device may be easier than on-axis arrangements and may not require removal/disassembly of the screw actuator.

BRIEF DESCRIPTION OF THE DRAWINGS

Certain embodiments of the present disclosure will now be described in greater detail by way of example only and with reference to the accompanying drawings in which.

DETAILED DESCRIPTION

Figure 1A:
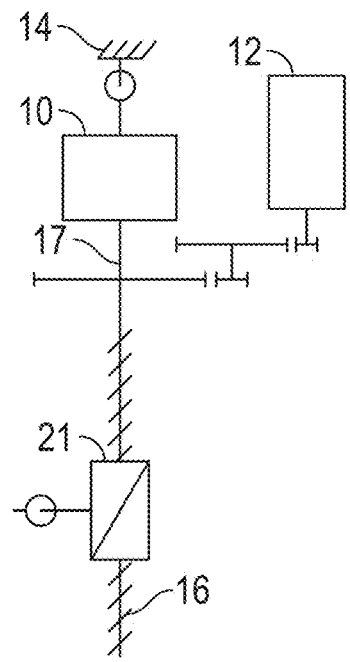
FIGS. 1A to 1C show screw actuators with no-back devices in different locations relative to the motor for the actuator.
Figure 1B:
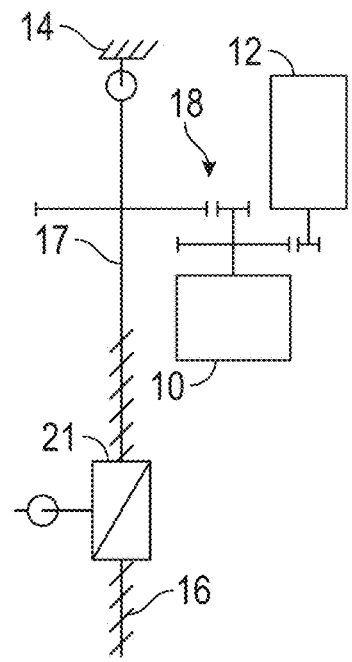
Figure 1C:
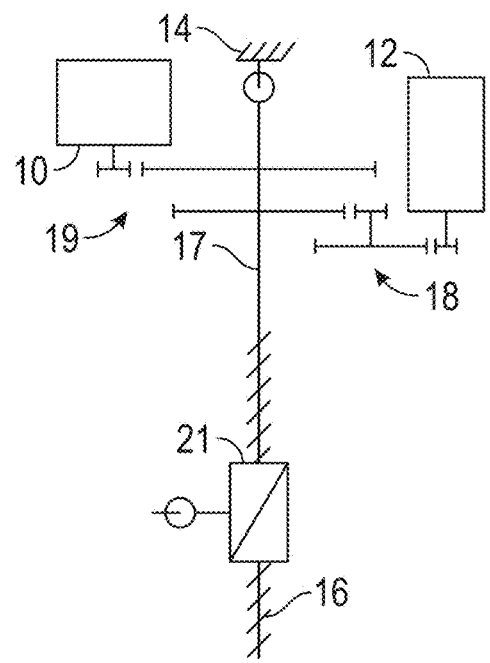

A no-back device is used to prevent unwanted reverse movement of a screw shaft in a screw actuator. FIGS. 1A-C show three possible locations for a no-back device 10 relative to a screw actuator 16 connected to an airframe 14. The screw actuator 16 has a drive shaft 17 driving a screw shaft with an actuator output device 21 mounted on the screw shaft 17 and engaged with the threads thereof. The actuator output device 21 acts as a nut on the screw shaft, and can be moved linearly along the screw shaft in response to rotation of the drive shaft 17. A motor 12 can rotate the drive shaft 17 via gearing 18. In FIG. 1A, the no-back device 10 is on the axis of a screw actuator drive shaft 17, such that axial loading on the screw actuator 16, for example from aerodynamic loading of a flap of an aircraft, can be transmitted into the no-back device 10. A motor 12 is provided for turning the drive shaft 17 via gearing 18. The arrangement of FIG. 1A is commonly used in the prior art, wherein feedback axial loads on the screw shaft are transmitted directly into a no-back device, and the no-back device utilises this axial load to provide braking torque against the feedback forces.

In FIG. 1B, the no-back device 10 is located off the axis of the screw actuator 16. In this Figure, the no-back device 10 and its control mechanism is located in the mechanical path between a motor 12 for the screw actuator 16 and the drive shaft 17, i.e. within gearing 18. This may be referred to as the motor 12 and no-back device 10 (or its control mechanism) being "in series". Axial loading of the screw actuator 16 is not transmitted to the no-back device 10 or to the motor 12 and consequently conventional no-back devices making use of this axial force to activate the no-back device cannot be implemented in this arrangement.

In FIG. 1C, the no-back device 10 is located off the axis of the screw actuator 16 and, in contrast to FIG. 1B, the no-back device 10 and its control mechanism are not in the mechanical path between the motor 12 and the drive shaft 17, i.e. not in gearing 18. Instead, the no-back device 10 of FIG. 1C has its own connection to the drive shaft 17 via gearing 19. This may be referred to as the motor 12 and the no-back device 10 (or its control mechanism) being "in parallel". Again, axial loading of the screw actuator 16 is not transmitted to the no-back device 10 or the motor 12 and consequently conventional no-back devices making use of this axial force to activate the no-back device cannot be implemented in this way.

The actuator structure also supports the bearings of the geared shafts, the motor casing 12, and no-back devices 10, 20, 30.

The no-back devices 10, 20, 30 described herein do not require the use of axial feedback force for a braking torque to be applied and therefore they do not need to be located on the screw shaft axis (although they can be located on this axis if that is convenient). This increases the flexibility in implementation of the no-back device 10, 20, 30. The no-back devices 10, 20, 30 described herein can also more reliably apply a braking torque to the drive shaft 17 of the screw actuator 16, in part since this force is applied with or without axial feedback loading on the drive shaft 17.

Figure 2B:
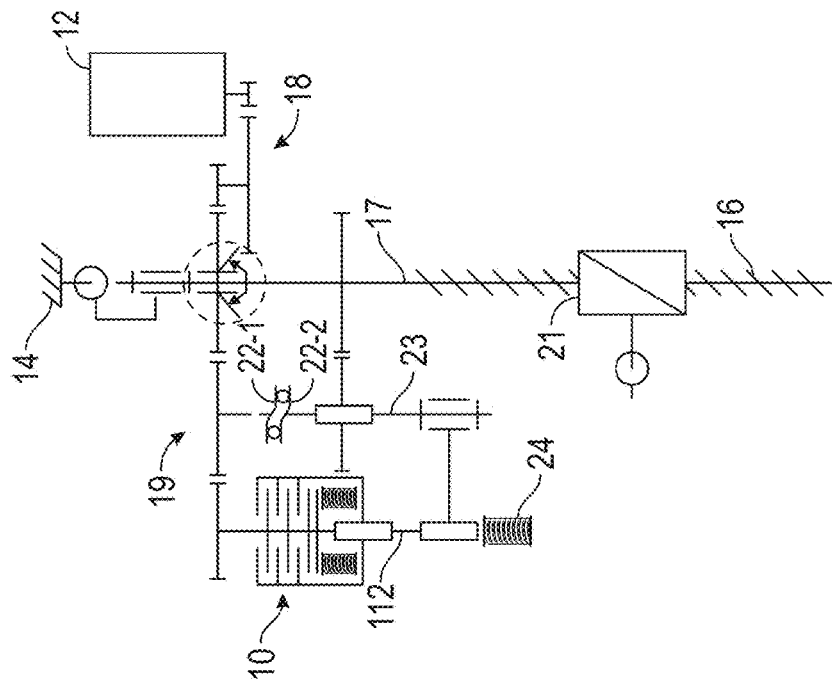
FIG. 2B shows a similar no-back device to that of FIG. 2A but arranged "in parallel"
Figure 2A:
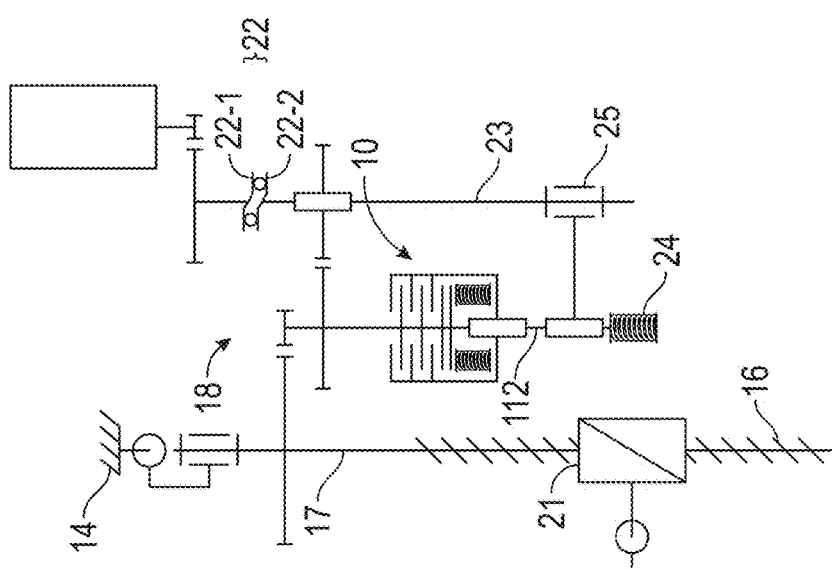
FIG. 2A shows an "in series" arrangement for a no-back device.

FIG. 2A shows a mechanically controlled no-back device 10 in series configuration with a motor 12 and drive shaft 17. FIG. 2B shows a similar no-back device 10 to that of FIG. 2A, but mounted in parallel configuration with a motor 12 and drive shaft 17. In both arrangements a ball ramp 22 is provided between the motor 12 and the no-back device 10. The ball ramp 22 comprises three main components, a ball and two opposing ramped surfaces, a first, upper ramped surface 22.1 and a second, lower ramped surface 22.2, sandwiching the ball. "Upper" and "lower" in relation to the ramped surfaces 22.1, 22.2 refers to the orientation shown in FIGS. 2A and 2B and do not describe the orientation with respect to gravity.

The ramped surfaces 22.1, 22.2 of the ball ramp 22 are able to rotate, within a limited angular stroke, around a common axis of rotation and to move together/apart along the axis of rotation within set bounds. When the ramped surfaces 22.1, 22.2 are at a first relative orientation, the ball sits at the "lowest" point of each ramped surface such that the two ramped surfaces 22.1, 22.2 sit close together. When the ramped surfaces 22.1, 22.2 are moved to a second relative orientation (e.g. by rotation of the upper ramp 22.1 while the lower ramp 22.2 is held static) then the ball, pushing on both ramps 22.1, 22.2, moves up both ramps causing the ramped surfaces 22.1, 22.2 to move apart. When the ball is at the top of both ramps then the two ramped surfaces 22.1, 22.2 are at their furthest distance apart. At this point a mechanical angular stop in the ball ramp 22 prevents further relative rotation of the ramped surfaces 22.1, 22.2. In the orientation shown in FIGS. 2A and 2B, the ball ramp 22 may extend and retract in the vertical axis along the axis of rotation of the ramped surfaces 22.1, 22.2. A spring 24 may be used in combination with a spring 102 in the no-back device (described below), to bias the ball ramp 22 to its smallest configuration (i.e. least distance between the two ramped surfaces 22.1, 22.2 along the common axis).

Figure 3:
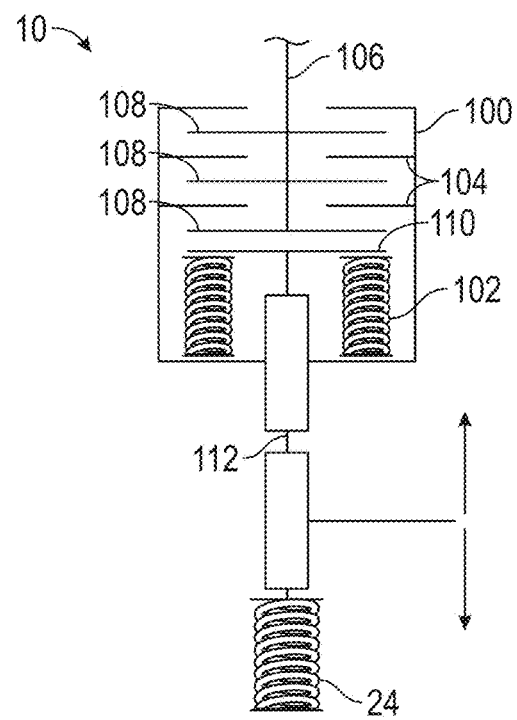
FIG. 3 shows an enlarged view of a no-back device as used in the arrangements of FIGS. 2A and 2B.

An enlarged view of the no-back device 10 in FIGS. 2A and 2B is shown in FIG. 3. The no-back device 10 comprises a housing 100 having a plurality of internal flanges 104, which may be annular flanges connected to the housing 100 at their respective outer extents. The internal flanges 104 may be stator reacting discs that are held against rotation by splines (not shown) on the housing 100. A rotary shaft 106 extends into the housing 100 and there are one or more flanges 108 connected to the rotary shaft 106. The flanges 108 of the rotary shaft may be rotor discs that are held for rotation with the rotary shaft 106 by splines (not shown) on the rotary shaft 106. The rotary shaft 106 extends through the internal flanges 104 of the housing and the flange(s) 108 of the rotary shaft extend between an opposed pair of the internal flanges 104 or between an internal flange and a movable flange 110, described below. The purpose of the flanges 108 of the rotary shaft, the movable flange 110, and flanges 104 of the housing are to provide braking forces between the housing and the rotary shaft when desired. The use of splines to connect the internal flanges 104 to the housing and the 108 to the shaft may allow establishment of uniform contact pressure between adjacent flanges during braking.

A spring 102 is located at the base of the housing ("base" being defined as the lower end according to the orientation shown in FIG. 3). The spring 102 abuts the housing 100 at the lower end (again, "lower" being defined in the orientation shown in the Figure) and the movable flange 110 is connected to the spring 102 at its upper end. The spring 102 is compressed within the housing 100 and thus has a preload that biases the movable flange 110 in an axial direction along the axis of the rotary shaft 106. That is, the spring 102 urges the movable flange 110 toward a flange 108 of the rotary shaft 106 and, this urges the rotary shaft 106 upward (in the orientation shown in the Figure) so that the flanges 108 are pushed against the inner flanges 104 of the housing 100. Thus, via friction between the various flanges 110, 108, 104, the no-back device 10 acts to inhibit rotation of the rotary shaft 106 relative to the housing 100. That is, the no-back device 10 applies a braking force to the shaft 106 in the default state (i.e. when no motor torque is being applied) under action of the spring 102. When the housing 100 is fixed against rotation relative to the motor 12 and the rotary shaft 106 is connected to a rotary actuator screw shaft 17, the no-back device 10 may thus act to inhibit rotation of the screw shaft and thus inhibit movement of the screw actuator 16. In this case the housing flanges 104 act as no-back device brake members and the shaft flanges 108 act as screw shaft brake members.

The movable flange 110 is connected to, or formed integrally with, a shaft 112 that abuts the spring 24. As noted above, and with reference back to FIGS. 2A and 2B, this same spring 24 is used to bias the ball ramp 22 to its minimal extent. The shaft 112 extends along the direction of motion of the movable flange 110.

While the ball ramp 22 is at its minimal extent, the spring 24, via the shaft 112, preferably does not increase or decrease the pressure between the movable flange 110 and the rotary shaft flange 108. That is, the spring 24 does not affect the braking force of the no-back device 10 whilst the ball ramp 22 is at its minimal extent, and unlike the spring 102 within the housing 100 of the no-back device 10 the spring 24 coupled to the ball-ramp control shaft 23 is not compressed when the motor 12 is at rest. This situation changes when the ball ramp 22 lengthens, as described below.

The spring 24 may act to accommodate wear in the flanges 104, 108 in the no-back device 10 without reducing the preload applied to these flanges 104, 108, by the spring 102 inside the housing 100.

To obtain the desired friction between the flanges 110, 108, 104 in the no-back device 10, one or more of the flanges 110, 108, 104 may be or may comprise a friction disc, or a disc having angled roller (e.g. as described in the Boeing patent U.S. Pat. No. 6,109,415) or other suitable means of generating friction between the flanges 110, 108, 104.

As seen in FIGS. 2A and 2B a control shaft 23 connects the ball ramp 22 to the shaft 112 via a coupling 25. The coupling 25 allows the control shaft 23 to rotate freely relative to the shaft 112, but transfers any axial movement. The upper end of the ball ramp 22 is fixed, for example via its connection to the motor 12, which itself is fixed with respect to the airframe 14, either directly or indirectly. Thus, when the ball ramp 22 elongates, the upper ramped surface 22.1 cannot move axially, the lower ramped surface 22.2 moves axially away from the upper ramped surface 22.1 and the control shaft 23 moves downward (in the orientation shown). This moves the shaft 112 downward and compresses the spring 24 connected to the airframe as well as compressing the spring 102 within the housing 100 of the no-back device 10. This urges the movable flange 110 away from the flanges 108 of the rotary shaft 106, thus reducing the frictional force.

It will be appreciated that this provides a mechanism by which the no-back device 10 may be released when the motor 12 starts to apply torque in either direction. In the series arrangement of FIG. 2A, the lower ramp 22.2 of the ball ramp 22 is coupled to the rotary shaft 106 (e.g. by or as part of gearing 18). When the ball ramp 22 is at its minimal extent, the lower ramp 22.2 is consequently prevented from rotating by the no-back device 10. When the motor 12, connected to the upper ramp 22.1 of the ball ramp 22, first outputs torque this torque acts to turn the upper ramp 22.1 relative to the lower ramp 22.2 while the lower ramp 22.2 remains held against rotation by the no-back device 10. This relative rotation causes the lower ramp 22.2 to extend away from the upper ramp 22.1, which is held axially static by the motor 12 that is fixed relative to the airframe 14. The axial extension of the ball ramp 22 moves the shaft 23 that is connected to the ball ramp 22 and via the coupling 25 moves the shaft 112 connected to the no-back device. This then reduces the braking force of the no-back device 10. When the braking force on the rotary shaft 106 in the no-back device 10 has reduced sufficiently then the lower ramp 22.2 can start to turn along with the upper ramp 22.1. This rotation is carried through the gears 18 and acts to turn the drive shaft 17 of the rotary actuator 16

When the motor 12 ceases to output torque to the upper ramped surface 22.1, the force of the spring 24 biases the ball ramp 22 back to its minimal extent and at the same time the spring 102 within the housing 100 of the no-back device 10 is free to apply compression between the flanges 110, 108, 104. This reapplies the braking force from the no-back device 10 on the rotary shaft 106 and the screw actuator 16 is again braked against movement.

Alternatively or additionally, if the nut 21 of the rotary actuator 16 is experiencing a load in the direction that the motor 12 is trying to turn the screw shaft (an "aiding" load) then it is possible for the motor 12 to only output sufficient torque to reduce the braking force such that the aiding load drives the nut 21 to the desired location. That is, the motor 12 can make use of the aiding aerodynamic load to move the nut 21, and thus the motor 12 may use less power.

Turning now to the similar set-up shown in FIG. 2B, this differs from that of FIG. 2A since the connection between the motor 12 and the no-back device 10 goes via the drive shaft 17 of the screw actuator 16 (which is braked by default) rather than the connection to the no-back device 10 being between the motor 12 and the screw actuator 16. Thus, the motor 12, the no-back device 10 and the ball ramp 22 are mounted in parallel with the drive shaft 17 of the screw actuator 16. In the example of FIG. 2B a shaft coupling 28 is used to provide the interconnection between the motor 10, the drive shaft 17 and the no-back device 10. This shaft coupling 28 allows some play such that torque from the motor 12 may be transmitted between the gearing 18 at the motor 12 and gearing 19 beyond the drive shaft 17 and hence to the ball ramp 22. The use of a shaft coupling 28 with play means that the motor 12 can act to change the length of the ball ramp 22 without any movement of the drive shaft 17. Thus, the torque of the motor 12 can be transmitted across the drive shaft 17 to the gearing 19 and onward to the no-back device 10 whilst the shaft 17 is braked, and the no-back device 10 can then release the drive shaft 17 for movement driving by further rotation from the motor 12.

Figure 4:
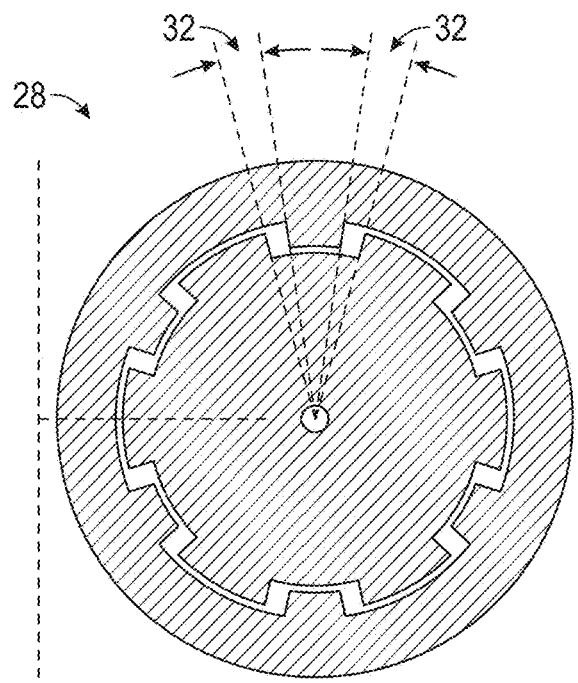
FIG. 4 shows a concentric gearing system that allows limited angular movement between two gears before they move together as used in FIG. 2B, for example.

The shaft coupling 28 may make use of concentric gears as shown in FIG. 4, with play 32 between the gears allowing for movement relative movement of the inner and outer gears before the two gears engage. With this arrangement the motor 12 may be coupled to the inner gear and the inner gear may be coupled to the gearing 19 for the no-back device 10 in order to transfer torque from the motor 12 to the no-back device 10. This then allows the no-back device 10 to be disengaged before the concentric gears of the shaft coupling 28 are engaged with one another. The drive shaft 17 can be coupled to the outer gear so that the motor 12 can rotate the drive shaft 17 once the play between the concentric gears has allowed the motor 12 to disengage the no-back device 10.

Another way to implement a suitable shaft coupling 28 with play is to use a differential gear. A suitable differential gear can have three gears, with a first gear rigidly attached to the rotary shaft 106 that is itself meshed to the shaft 17 that drives the actuator screw shaft. A second gear of the differential can be coaxial with the first gear and rigidly attached to the ball ramp plate 22.1, but able to rotate relative to the rotary shaft 106. The third gear of the differential is at 90 degrees to the first and second gears and is connected via a bevel gearing both of to the first and second gears, with this third gear being coupled to the motor drive gear 18 via a pivot liaison. The drive gear 18 hence constitutes a satellite holder for the differential and this is meshed to the motor 12.

With this use of a differential then when the motor 12 drives the system, it transmits a torque to the satellite holder 18 that activates the ball ramp 22 by moving apart the ramped surfaces 22.1 and 22.2. This occurs since the third satellite gear is braked on one side due to its connection with the first satellite gear, which is held by the brake through the rotary shaft 106, whereas on the other side the third gear is coupled to the second gear, which can turn the upper ball ramp 22.1. Thus, with the main shaft braked then the differential preferentially turns the ball ramp. Once the ball ramp 22 extends then the first gear of the differential is unbraked and torque can then be transmitted by the satellite holder 18 and the third gear to the first gear, since movement of the second gear is now prevented by the ball ramp 22, which will be prevented from rotating by its limited angle or movement.

When the motor 12 stops driving the system, the differential does not receive torque and consequently the ball ramp 22 moves back to its resting state through the action of the springs 102. This also engages the brake on the main shaft 17 by pressing the sliding flange 110 onto the stack of shaft flanges 108 and internal flanges 104.

Referring back to FIG. 2B it will be understood that by means of the shaft coupling 28 the motor 12 can turn the upper ramp 22.1 of the ball ramp 22 relative to the lower ramp 22.2 whilst the drive shaft 17 is prevented from moving by the no-back device 10. The motor 12 can thus release the no-back device 10 in the same manner as described for FIG. 2A above. When the no-back device 10 is released then the shaft coupling 28 delivers torque from the motor 12 to the drive shaft 17 and thus the motor 12 drives the screw actuator 16.

Figure 5B:
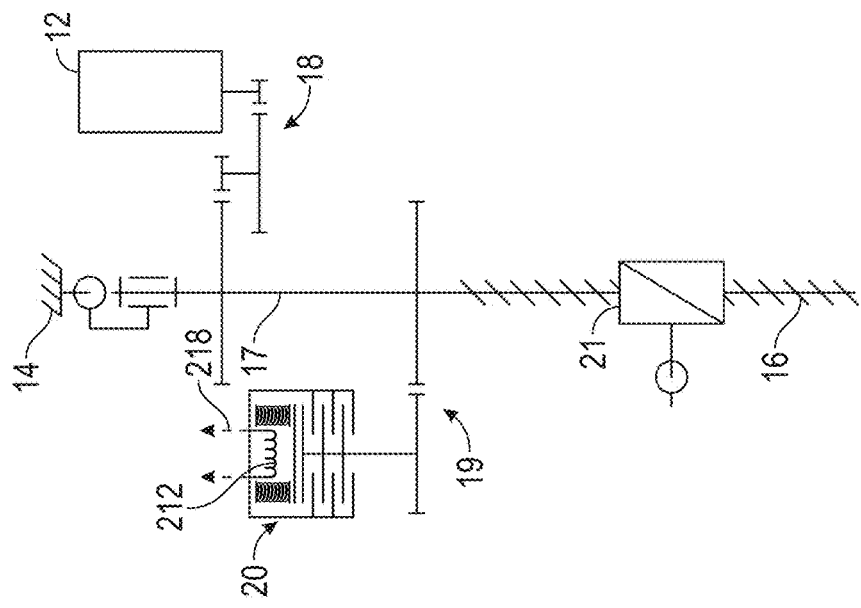
FIG. 5B shows a similar no-back device to FIG. 5A with an "in parallel" arrangement.
Figure 5A:
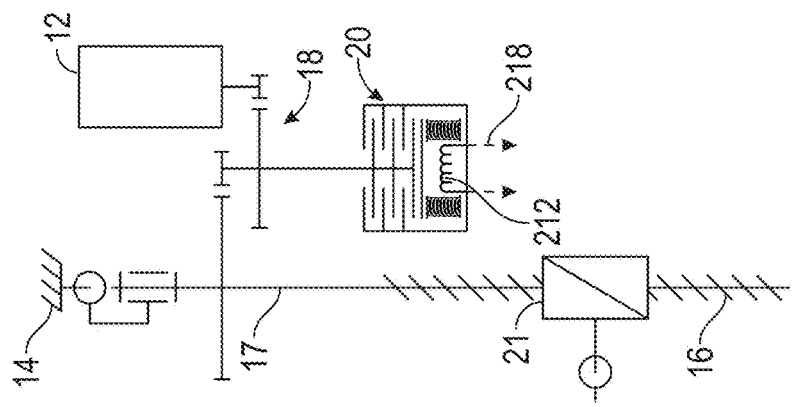
FIG. 5A shows the use of an electromechanical actuator to control a no-back device with an "in series" arrangement.
Figure 6:
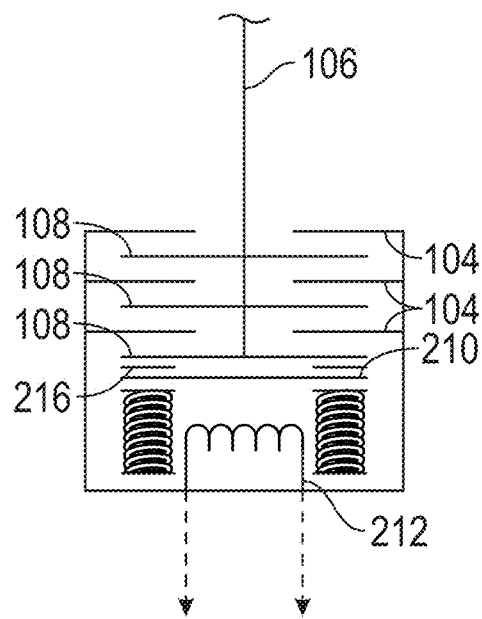
FIG. 6 shows an enlarged view of the electromechanically controlled no-back device of FIGS. 5A and 5B.

In the example of FIG. 2B, the torque transmitted from the motor 12 to the drive shaft 17 does not pass directly through the ball ramp 22. In an alternative no-back device 20, as shown in FIGS. 5A, 5B and 6, the control of the no-back device 20 is performed by an electromechanical actuator. It will be understood that the arrangement of FIG. 5A is similar to that of FIG. 2A (and FIG. 1B), with the mechanical no-back device 10 and ball ramp 22 of FIG. 3 being substituted by an electromagnetically controlled no-back device 20 as in FIG. 6, and the arrangement of FIG. 5B is similar to that of FIG. 2B (and FIG. 1C), with the mechanical no-back device 10 and ball ramp 22 and angular arrangement 28 of FIG. 3 all substituted by the electromagnetically controlled no-back device 20 of FIG. 6. As best seen in FIG. 6, the no-back device 20 in these examples has a similar arrangement to that of FIG. 3 in relation to the housing 100, housing flanges 104, shaft 106 and shaft flanges 108. The housing flanges 104 act as no-back device brake members and the shaft flanges 108 act as screw shaft brake members when the shaft 106 is connected to the screw shaft 17 of the screw actuator 16. An electromagnet 212 is situated within the housing 100 of the no-back device 20 and is configured to interact via a movable flange 210 with a brake pad 216. The brake pad 216 can engage with the flange 108 at the end of the shaft 106 and pressure of the brake pad 216 against this shaft flange 108 acts in the same way as the pressure of the movable flange 110 of FIG. 3 against the shaft flange 108 of FIG. 3. The electromagnet 212 is configured to pull and/or push the movable flange 210 in order to vary the braking force of the brake pad 216 against the end flange 108 of the rotary shaft 106. A spring 202 is disposed between the movable flange 210 and the base of the housing 100. This allows for a compressive force on the brake pad 216 when the electromagnet 212 is not applying any force to the movable flange 210. The movable flange 210 may be formed integrally with the brake pad 216. This allows the no-back device 20 to restrict the rotation of the rotary shaft 106 even when there is no current through the electromagnet 212.

In this design, the braking force is not mechanically coupled to the motor torque (e.g. by means of a ball ramp 22). Instead, the control electronics for the motor 12 can be configured release the no-back device 20 when the motor 12 is activated and actuation of the screw actuator 16 is desired.

For example, the electrical connection 218 of the electromagnet 212 may be operatively connected to the control system for the motor 12 so that activation of the motor is synchronized with reducing the braking force via the electromagnet 212. Alternatively, the control electronics 218 may be the same control electronics as operate the motor 12. That is, there may be one electronic system or plural electronic systems for synchronizing the motor 12 and no-back device 20.

In FIG. 5A the electromechanically actuated no-back device 20 is connected within the gearing 18 on the motor side of the drive shaft 17 as with the series configuration of FIG. 2A. In the alternative arrangement in FIG. 5B the motor is directly coupled to the drive shaft 17 via the gearing 18 and the electromechanically actuated no-back device 20 is instead provided with separate no-back device gearing 19 connected to the shaft 17 at another point. This is similar to the parallel configuration of FIG. 2B, but with the use of an electromechanically actuated no-back device 20 there is no need for a shaft coupling 28 to transmit torque across the shaft without movement of the shaft.

Figure 8:
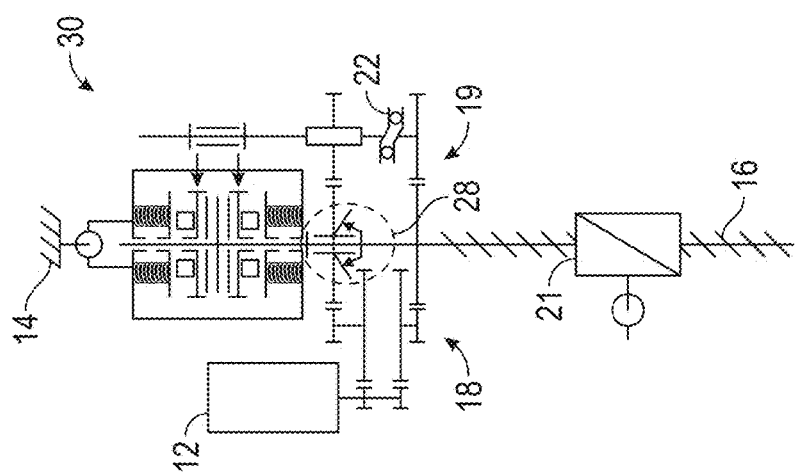
FIG. 8 shows a no-back device on a shaft axis being controlled "in parallel"
Figure 9:
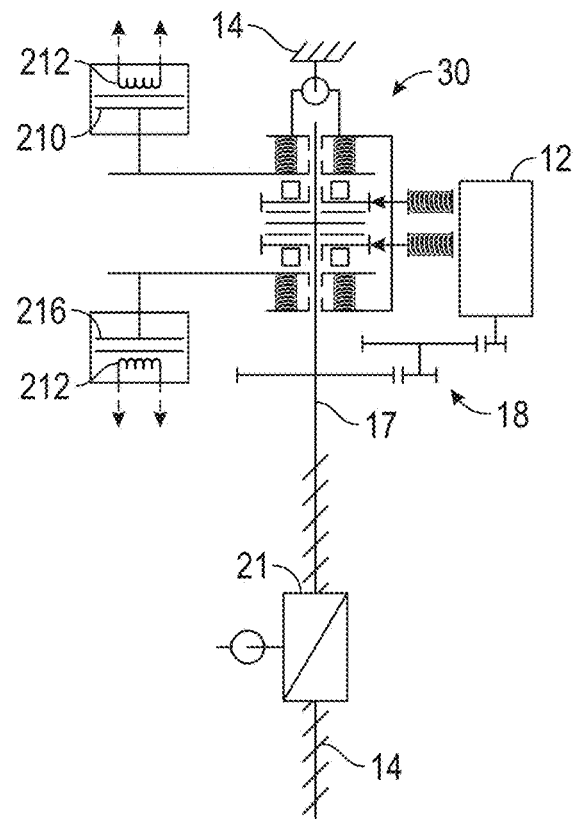
FIG. 9 shows a no-back device on a shaft axis being controlled by an electromechanical actuator.
Figure 10:
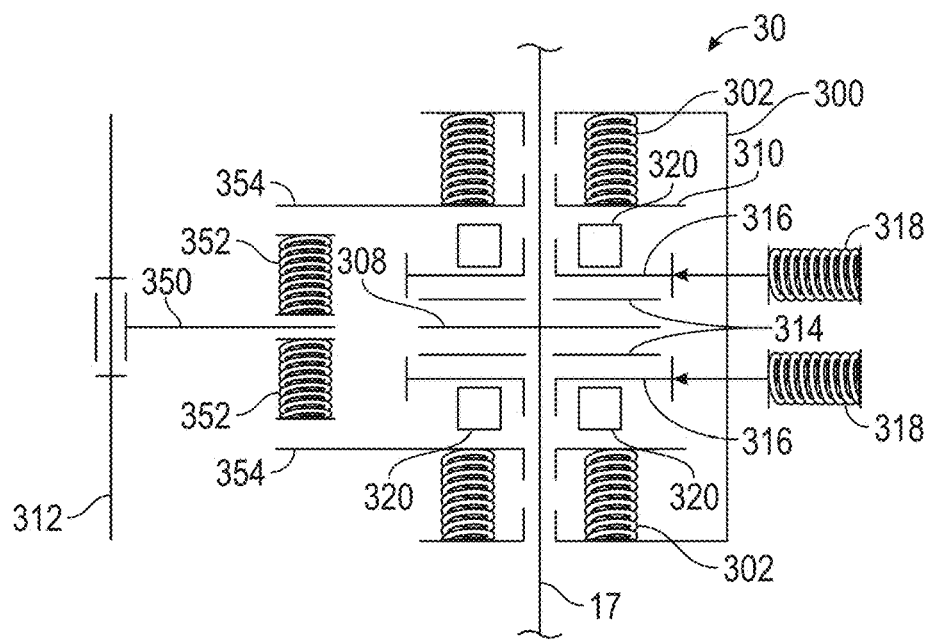
FIG. 10 is a close up view of an on-axis no-back device.

In another alternative design, shown in FIGS. 7 to 10, a mechanical no-back device 30 is installed on the axis of the screw actuator 16 such that axial loads on the screw shaft 17 are transmitted into the no-back device 30 and the frictional torque of the no-back device 30 is proportional to the axial load when the associated ratchet wheel is locked. The on-axis no-back device 30 applies a braking torque irrespective of the axial loading, but when it is required to turn the drive shaft 17 then the axial loading is utilised to engage a ratchet mechanism similar to that described in U.S. Pat. No. 6,109,415 and in U.S. Pat. No. 4,762,205 in order to prevent unwanted reverse movement of the drive shaft 17 whilst the motor 12 is applying torque. An enlarged version of this type of no-back device 30 is shown in FIG. 10 and this is described in more detail below.

In one example, the braking force in the no-back device 30 is set to be a little bit lower than the torque required to counteract torque induced by aerodynamic loading of the nut. The braking force is controlled to increase or decrease via additional preload inside the no-back device 30 that may be controlled using the ball ramp 22 described above. In the example shown in FIG. 8 the preload is not controlled but instead the system controls the engagement and release of the pawls to lock/release the ratchet wheels in the no-back device 30. Movement of the nut along the actuator is then controlled through the full engagement or the full release of the braking force. The control of the pawls may be carried using the ball-ramp 22 described above.

Figure 7:
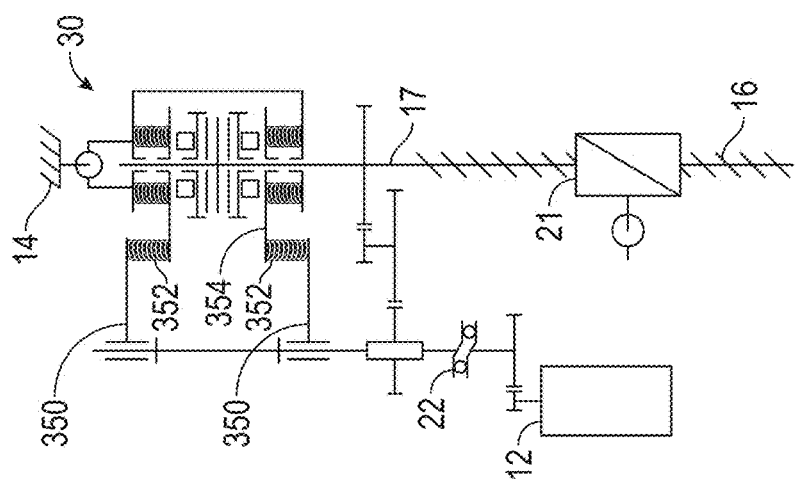
FIG. 7 shows a no-back device on a shaft axis being controlled "in series"

With reference to FIG. 7 it will be seen that the axially mounted no-back device 30 is controlled via a ball-ramp 22 that is located within the motor side gearing 18 in a way similar to the arrangement of FIG. 2A. The example of FIG. 8 uses a similar on-axis no-back device 30, but the ball-ramp 22 is arranged in a way similar to FIG. 2B, with a shaft coupling 28 passing torque across the (braked) drive shaft 17 from the motor side gearing 18 to no-back device gearing 19 beyond the shaft. As with FIGS. 2A and 2B the ball-ramp 22 can generate an axial movement to control the no-back device 30. The example shown in FIG. 9 uses a similar on-axis no-back device 30, but instead of being mechanically controlled via a ball-ramp 22 the no-back device 30 is electromagnetically controlled via a pair of electromagnets 212 each arranged for moving a movable flange 210 that is connected to the axially mounted no-back device 30. The electromagnets 212 can be activated when the motor 12 is activated in a similar fashion to the electromagnet 212 of FIG. 6.

Considering the on-axis no-back device 30 in more detail, with reference to FIG. 10, the drive shaft 17 of the screw actuator 16 passes through a housing 300 of the no-back device 30, and a shaft flange 308 extends radially outward from the shaft 17. The shaft flange 308 and is connected to the shaft 17 or formed integrally with the shaft 17 and provides the screw shaft brake member in a similar way to the flanges 108 of the no-back device 10 of FIG. 3. The no-back device 30 is symmetrical on either side of the flange 308. To either side of the flange 308 a pair of brake pads 314 are provided. These may be friction pads or skewed rollers or other friction-inducing means to prevent rotation. They provide the no-back device brake member. Abutting each of the brake pads 314 is a ratchet 316 having rollers 320. On the opposite side to the ratchet the rollers 320 are in contact with movable flanges 310, that have a similar role to the movable flange 110 described in relation to FIG. 3. The rollers 320 are configured to ensure low friction between the ratchets 314 and the adjacent movable flanges 310, such that the axial loading of the movable flanges 310 against the ratchets 316 is transmitted to the brake pads 314, but relative rotation between the movable flanges 310 and the ratchets 316 is not restricted. Spring loaded pawls 318 are used to stop rotation of the ratchets 316 in one direction and to allow free rotation of the ratchets 316 in the other direction. In a variation of this arrangement the spring loaded pawls 318 may be replaced with electromechanically controlled pawls or with mechanically controlled pawls controlled using a ball ramp device 22. Electromechanical control would allow the pawls to be totally disengaged at will and allow free rotation of a given ratchet about its axis in either direction. This could be useful during maintenance or in case of a breakdown In operation, axial loading of the shaft 17 is passed into the shaft flange 308 of the on-axis no-back device. The flange 308 loads against one or the other of the brake pads 314 depending on the direction of the axial load. That brake pad 314 is loaded against its adjacent ratchet 316, which loads that ratchet against its adjacent movable flange 310. The ratchet 316 is free to rotate about its axis in a first direction and prevented from rotation by pawls 318 in the opposite direction. The directionality of the each ratchet 316 is set so that the direction of rotation of the drive shaft 17 that would be induced by the axial load direction that loads the ratchet is prevented. Hence, the ratchets 316 on either side of the shaft flange 308 are arranged to prevent different directions of rotation, since one is loaded by an axial load in one direction along the shaft 17 (which corresponds to a first rotation direction of the shaft), and the other is loaded by an axial load in the opposite direction (with a correspondingly opposite rotation direction). In the example of FIG. 8, the pawls may be disengaged from the ratchets.

Thus far, the no-back device 30 has a similar setup to known no-back devices. In contrast to existing devices the movable flanges 310 are joined to the housing 300 via springs 302, which are used to apply a load within the no-back device 30 to restrict movement of the shaft flange 308 even when there is no axial loading on the shaft 17. The movable flanges 310 are configured to be able to move axially within the housing 300, i.e. along the axis of the shaft 17, but are prevented from rotation about this axis. This may be done using splines on the housing mating with splines on each movable flange 310 or by using other suitable means, such as radially arranged locking pins.

The movable flanges 310 are movable to vary the force between the respective brake pad 314 and the shaft flange 308. This varies the braking force applied by the no-back device 30 in response to a given axial load on the shaft 17, which is converted to a given feedback torque by the interaction of nut 21 and screw shaft 17. In particular, it allows for reduction in the braking force of the no-back device 30 by acting against the preload force from the spring 302 biasing the respective brake pad 314 into the flange 308.

This feature enables the no-back device 30 to controllably allow slip of the flange 308 when it is biased against a brake pad 314. Thus, when the axial feedback load on the nut 21 of the screw actuator 16 is in a direction that aids the required movement of the actuator 16 (i.e. a direction the pilot wishes to move the flap connected to the nut 21), then movement of the relevant movable flange 310 against its spring 302 allows the shaft flange 308 to controllably slip against the brake pads 314 of the no-back device until the nut 21 is at the desired position along the actuator shaft 17. At that point, the movable flange 310 may be returned to its original position such that the braking force between the brake pad 314 and flange 308 rises again, and the shaft 17 is prevented from further rotation. In this way the feedback torque from axial load on the drive shaft 17 can be permitted to controllably move the actuator, with minimal input from the motor 12. When the shaft 17 should be moved against the direction of the feedback torque then the opposite movable flange 310 will be pushed against its spring 302 releasing the respective brake pad 314 from the shaft flange 308 whilst it is still braked against rotation by the other brake pad 314 and ratchet 316. The motor 12 can then rotate the drive shaft 17 in the direction of free movement of that ratchet 316 in order to safely move the actuator in the required direction without any risk of backward movement.

One example of control of the movable flanges 310 will now be described with reference to FIG. 10, which shows a first rod 350 that sits between a pair of symmetrically arranged connecting rods 354 (in the orientation shown in the figure). The first rod 350 is connected via springs 352 to the two connecting rods 354. Each of the connecting rods 354 is connected to a respective movable flange 310. The first rod 350 is operatively connected to a ball-ramp device 22 such that elongation/contraction of the ball-ramp device 22 moves the first rod 350 against one or other of the springs 352 connecting to the connecting rods 354 and hence increases the force of one movable flange 310 pushing its brake pad 314 against the shaft flange 308, whilst decreasing the force of the other movable flange 310 against the other brake pad 314. The ball-ramp device 22 will generally be controlled so as to reduce the force of one brake pad 314 against the shaft-flange 308 to allow rotation of the shaft 17; during this operation, the increased force on the other brake pad 314 does not inhibit rotation due to the adjacent ratchet 316 allowing this brake pad 314 to rotate freely with the shaft-flange 308. Alternatively, the increased force on the other brake pad 314 may be negated by an axial load that is already present.

As with the mechanical arrangement of FIG. 3, when the no-back device 30 of FIG. 10 is controlled mechanically to allow aiding aerodynamic loads to move the nut 21 in the desired direction, then torque output from the motor 12 acts to elongate the ball-ramp device 22 until the elongation reduces the braking force of the no-back device 30 in the torque direction of the motor 12. This hence allows for rotation of the drive shaft 17 driven by the motor 12 and optionally aided by the feedback torque on the actuator. Once the braking torque on the drive shaft 17 has reduced sufficiently then the ball-ramp device 22 starts to fully rotate and torque is transmitted from the motor to the drive shaft 17 via gears 18.

A variation of the control of the movable flanges 310 is shown in FIG. 7 wherein, instead of a single first rod 350 being connected via springs 352 to the connecting rods 354, there are instead two rods 350 between the axially moving shaft connected to the ball-ramp 22 and the connecting rods 354. In FIG. 8 the ball-ramp 22, which is across the shaft 17 from the motor 12, could be coupled either via one or two rods 350 to control engagement/release of the pawls for the ratchets 316. In FIG. 9 there is no ball-ramp 22 since an electromechanical actuator is used instead, and with this arrangement an on-axis no-back device 30 similar to that of FIG. 10 is controlled via electromagnetic actuators using electromagnets 212, which could be connected directly to the connecting rods 354 as shown in FIG. 9, with control of the no-back device 30 via movement of these rods 354 in accordance with the explanation above.

Note that in this example of an axially mounted no-back device 30, the ball-ramp device 22 is biased to its smallest extension either by the balance of the springs 352, 302, or by another spring (not shown). Instead, the no-back device springs 302 inside the housing 300 of the no-back device 30 and the springs 352 at the connecting rods 354 act to "centre" the system and define a default braking force on either side of the flange 308 from each of the movable flanges 310.

In further variations for the examples above, the ball-ramp 22 or electromagnet 212 may be replaced by other actuator types, including other types of mechanical actuators driven directly by the rotation of the motor 12 to control the no-back device.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A no-back device for an aircraft screw actuator, the screw actuator comprising: a screw shaft for threaded engagement with an actuator output device such that rotation of the screw shaft causes linear movement of the actuator output device; and a motor for driving rotation of the screw shaft, the no-back device being for restricting movement of the screw shaft in response to feedback torque applied due to external forces on the actuator output device, the no-back device comprising:
a brake, the brake including:
a no-back device brake member for engagement with a screw shaft brake member connected to the screw shaft in order to generate a braking torque on the screw shaft when the no-back device brake member and the screw shaft brake member engage with each other; and
a biasing device for providing a biasing force to urge the no-back device brake members and the screw shaft brake member to engage with when the motor is not activated, the biasing force resulting in a braking torque that resists rotation of the screw shaft under the feedback torque; and
a brake controller, the brake controller being arranged to provide a disengaging force to urge the no-back device brake member and the screw shaft brake member to disengage with each other, the disengaging force being applied upon activation of the motor for rotating the screw shaft, in order that the braking torque is reduced when the motor is activated.

2. The no-back device as claimed in claim 1, wherein the brake controller operates independent of axial feedback forces along the screw shaft or independent of axial feedback movement of the screw shaft.

3. The no-back device as claimed in claim 1, wherein when the motor is inactive the biasing device engages the brake to prevent movement of the screw shaft regardless of the presence or absence of axial force on the screw shaft.

4. The no-back device as claimed in claim 1, wherein the brake controller is arranged to move the no-back device brake member relative to the screw shaft brake member upon activation of the motor to move the brake members apart in order to thereby reduce the braking torque on the screw shaft.

5. The no-back device as claimed in claim 1, wherein the brake controller is a mechanical arrangement in which output torque from the motor is used to move the brake members relative to one another to reduce the braking torque on the screw shaft.

6. The no-back device as claimed in claim 1, wherein the brake controller includes a mechanically driven linear actuator for controlling relative movement of the brake members, the mechanically driven linear actuator receiving a rotating input from the motor and providing a linear output, wherein the linear output is provided when the screw shaft is not moving freely and when the screw shaft can move freely then the linear actuator ceases linear movement.

7. The no-back device as claimed in claim 1, wherein the brake controller comprises a ball-ramp device, wherein the ball-ramp device changes in dimension, based upon relative rotation of first and second portions of the ball-ramp device.

8. The no-back device as claimed in claim 7, wherein the relative rotation of the first and second portions of the ball-ramp device is induced by the motor turning the first portion of the ball-ramp device while the second portion of the ball-ramp device is held by the no-back device and the ball-ramp device thereby elongates, with this elongation providing the force to urge the brake members to disengage with one another.

9. The no-back device as claimed in claim 1, wherein a mechanical brake controller is located in the mechanical path between the motor and the drive shaft.

10. The no-back device as claimed in claim 1, wherein a mechanical brake controller is located outside of the mechanical path linking the motor to the drive shaft and at a point after the mechanical linkage from the motor has reached the drive shaft and the no-back device comprises an apparatus for conveying motor torque past the drive shaft while the drive shaft is braked.

11. The no-back device as claimed in claim 1, wherein the brake controller includes an electromechanical actuator for controlling the braking torque on the screw shaft.

12. The no-back device as claimed claim 1, being arranged for mounting off-axis relative to the screw shaft.

13. The no-back device as claimed in claim 1, wherein the no-back device receives a part of the screw shaft that transmits feedback axial loads, the screw shaft comprising a shaft flange acting as the screw shaft brake member; the no-back device comprising in order, on each side of the shaft flange, a brake pad acting as the no-back device brake member, a ratchet, and the biasing device that urges the brake pad to engage with the flange, wherein when the motor is inactive the brake pads apply a braking torque to the shaft and resist movement due to feedback torque generated by the interaction of the actuator output device on the screw thread and wherein when the motor is activated, the brake controller at least partially disengages the brake pad or ratchet in the direction that the motor seeks to turn the screw shaft.

14. An aerospace screw actuator comprising: a screw shaft for threaded engagement with an actuator output device such that in normal use rotation of the screw shaft causes linear movement of the actuator output device; a motor for driving rotation of the screw shaft; and the no-back device as claimed in claim 1.

15. A method of restricting movement of an aircraft screw shaft of a screw actuator in response to feedback torque applied due to external forces on an actuator output device connected to the screw shaft, wherein the screw actuator comprises a motor for moving the actuator output device by rotation of the screw shaft, the method comprising:
using a biasing device of a no-back device to engage a no-back device brake member with a screw shaft brake member connected to the screw shaft in order to generate a braking torque on the screw shaft, the biasing device providing a biasing force to urge the no-back device brake member and the screw shaft brake member to engage with each other when the motor is not activated; and
using a brake controller of the no-back device to provide a disengaging force to urge the brake members to disengage with one another, the disengaging force being applied upon activation of the motor for rotating the screw shaft, in order that the braking torque is reduced when the motor is activated.

16. A method of restricting movement of a screw shaft in a screw actuator in response to feedback torque applied due to external forces on an actuator output device, the method comprising using a no-back device as claimed in claim 1.

* * * * *